(12) United States Patent
Doehring

(10) Patent No.: US 11,993,070 B2
(45) Date of Patent: *May 28, 2024

(54) METHOD FOR PRODUCING A DIRECTLY PRINTED PANEL

(71) Applicant: Lignum Technologies AG, Niederteufen (CH)

(72) Inventor: Dieter Doehring, Grossenhain (DE)

(73) Assignee: Lignum Technologies AG, Niederteufen (CH)

( * ) Notice: Subject to any disclaimer, the term of this patent is extended or adjusted under 35 U.S.C. 154(b) by 1034 days.

This patent is subject to a terminal disclaimer.

(21) Appl. No.: 14/900,271

(22) PCT Filed: Jun. 20, 2013

(86) PCT No.: PCT/EP2013/062907
§ 371 (c)(1),
(2) Date: Dec. 21, 2015

(87) PCT Pub. No.: WO2014/202144
PCT Pub. Date: Dec. 24, 2014

(65) Prior Publication Data
US 2016/0200092 A1 Jul. 14, 2016

(51) Int. Cl.
*B41F 19/00* (2006.01)
*B05D 3/06* (2006.01)
(Continued)

(52) U.S. Cl.
CPC ............ *B41F 19/001* (2013.01); *B05D 3/067* (2013.01); *B05D 7/584* (2013.01); *B05D 7/586* (2013.01); *B05D 7/587* (2013.01); *B32B 21/02* (2013.01); *B32B 21/08* (2013.01); *B32B 27/308* (2013.01); *E04C 2/34* (2013.01); *E04C 2/38* (2013.01); *E04F 13/0866* (2013.01);
(Continued)

(58) Field of Classification Search
CPC .... B41F 19/001; B05D 3/067; E04F 13/0866; E04C 2/38
See application file for complete search history.

(56) References Cited

U.S. PATENT DOCUMENTS 2,345,419 A * 3/1944 Olson ...................... E04F 15/04
269/102
8,726,604 B2 5/2014 Hannig
(Continued)

FOREIGN PATENT DOCUMENTS

DE 10 2006 029 963 A1 1/2008
DE 10 2006 058 655 A1 6/2008
(Continued)

OTHER PUBLICATIONS

International Search Report for corresponding patent application No. PCT/EP2013/062907 dated Feb. 18, 2014.

*Primary Examiner* — Tong Guo
(74) *Attorney, Agent, or Firm* — Renner, Otto, Boisselle & Sklar, LLP

(57) ABSTRACT

The present invention relates to a panel as well as a method for producing a panel, in particular a wall- ceiling- or floor panel. The method according to the invention provides that a layer of liquid radiation curing acrylate with a low Martens hardness is applied on a support layer in a first step. This is followed by an application of an intermediate layer in a second step and thereafter the application of a further layer wet-on-wet, which as a Martens hardness after curing which is larger than the Martens hardness of the first applied layer. The resulting panel has an intermediate layer with an inhomogeneous hardness profile due to the wet-on-wet application which leads to particularly advantageous properties.

29 Claims, 2 Drawing Sheets

Figure 1A:
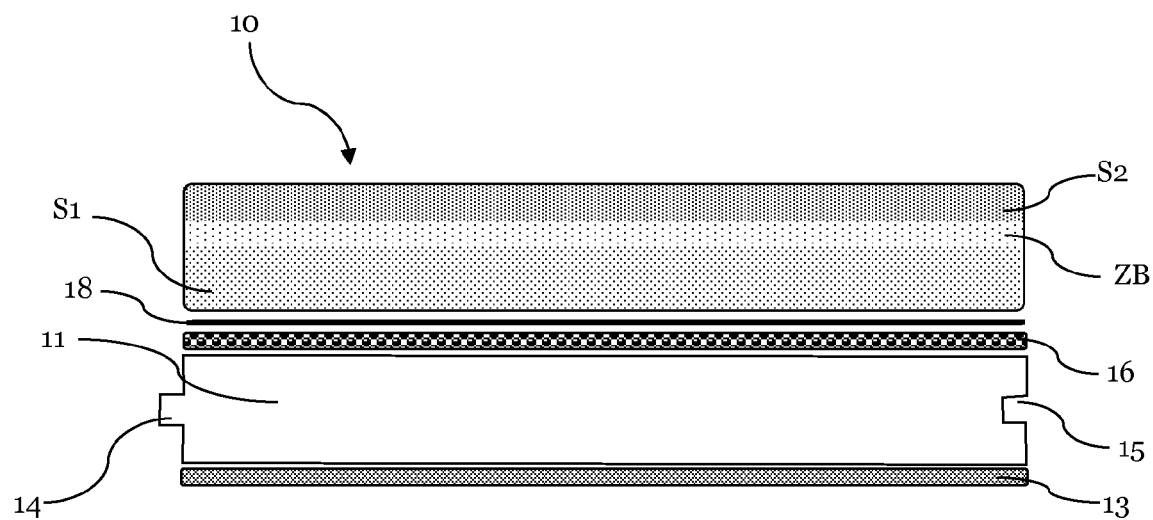

(51) Int. Cl.
  *B05D 7/00* (2006.01)
  *B32B 21/02* (2006.01)
  *B32B 21/08* (2006.01)
  *B32B 27/30* (2006.01)
  *E04C 2/34* (2006.01)
  *E04C 2/38* (2006.01)
  *E04F 13/08* (2006.01)
  *E04F 15/02* (2006.01)
  *B05D 5/06* (2006.01)
  *B05D 7/06* (2006.01)
  *E04F 15/10* (2006.01)

(52) U.S. Cl.
  CPC .... *E04F 13/0894* (2013.01); *E04F 15/02038* (2013.01); *B05D 5/06* (2013.01); *B05D 7/06* (2013.01); *E04F 15/102* (2013.01); *E04F 15/107* (2013.01)

(56) References Cited

U.S. PATENT DOCUMENTS

| | | | | |
|---|---|---|---|---|
| 2002/0059762 A1* | 5/2002 | Takeuchi | ............... | B44C 5/04 52/311.1 |
| 2006/0032175 A1* | 2/2006 | Chen | ............... | B32B 3/04 52/578 |
| 2009/0041987 A1 | 2/2009 | Schitter | | |
| 2010/0098963 A1* | 4/2010 | Dohring | ............... | B05C 1/14 428/537.1 |
| 2010/0233441 A1* | 9/2010 | Kubota | ............... | C14C 11/006 428/195.1 |
| 2013/0064988 A1 | 3/2013 | Döhring et al. | | |
| 2015/0064421 A1 | 3/2015 | Döhring | | |
| 2016/0129473 A1* | 5/2016 | Doehring | ............... | B05C 1/14 428/217 |
| 2016/0153190 A1* | 6/2016 | Doehring | ............... | E04C 2/20 428/192 |

FOREIGN PATENT DOCUMENTS

| | | | |
|---|---|---|---|
| EP | 1938963 A1 | | 7/2008 |
| JP | 2012-215064 | * | 3/2012 |
| RU | 2 392 402 C2 | | 6/2010 |
| RU | 2 465 415 C1 | | 10/2012 |
| RU | 2 483 177 C2 | | 5/2013 |
| WO | 2007/042258 A1 | | 4/2007 |
| WO | 2008 061765 A1 | | 5/2008 |
| WO | 2008 061791 A1 | | 5/2008 |
| WO | 2013 149644 A1 | | 10/2013 |

* cited by examiner

METHOD FOR PRODUCING A DIRECTLY PRINTED PANEL

1. FIELD OF THE INVENTION

The present invention relates to a panel as well as a method for producing such a panel, in particular a wall-, ceiling or floor panel with an improved surface coating.

2. BACKGROUND OF THE INVENTION

A plurality of panels for wall-, ceiling or floor coverings is known from the prior art. For example, so called laminate panels are widely used as floor coverings in indoor areas. The laminate panels are relatively inexpensive and can be processed well. They are usually applied on a support plate made of a MDF or HDF material, on top side of which a decorative paper, which is impregnated with a melamine resin, is applied. The resins are cured by pressing under the influence of heat and pressure, so that a highly abrasion-resistant surface is generated. Additionally, abrasion-resistant particles are often added to the surface before pressing, in particular corundum, for increasing the abrasion-resistance.

As an alternative to laminate panels, panels of high quality have been known for some time based on PVC and are distributed under the term LVT (Luxury Vinyl Tiles). For example, a floor panel in the form of a multi-layer, rectangular laminate with a support plate made of a soft polyvinyl chloride (PVC) is known from DE 10 2006 058 655 A1. A decorative paper web is glued on the soft PVC layer or plate to provide the visible surface of the PVC with a decoration. As an alternative to such decorative paper webs, which are applied on a PVC support plate, the use of plastic films is well known which are for example also printed with a decorative decoration.

For example, a floor covering made of polyvinyl chloride is known from DE 10 2006 029 963 A1, which is coated with a durable varnish layer to improve the durability of PVC floor covering. The varnish layer is based on an acrylic resin and is cured by means of radiation. The core of this printed publication lies in the addition of electrically conductive substances in the resin to provide the finished floor covering with antistatic and/or electrically conductive properties.

More recently LVT panels succeed on the market, which have a harder PVC plate with a thickness of 4-6 mm as a base and on top of which a soft PVC layer is applied with the properties, as described above. Particular profiles are milled as a coupling means in the harder plate. This way, the individual panels are easy to install to a surface.

In a further development of laminate panels as described above so-called directly printed panels were developed. No papers or films are applied any more, in particular no decorative paper with these directly printed panels. The decorative layer is rather printed directly on the surface of the support plate using dispersion paints by means of a gravure printing process ("Tiefdruckverfahren"), which are usually subject to a suitable pre-treatment. In particular, a primer ("Grundierung") is applied prior to printing by means of a roller application. Then, after drying of the decorative layer a plurality of resin layers are applied and cured. The resin layers serve as a protective layer as well as an abrasion-resistant surface. Here, too, abrasion-resistant particles, such as corundum, are added to further increase the abrasion-resistance.

For example, a method for direct coating wood-based panels is known from WO 2007/042258, in which a thick protective layer of plastic material is applied in liquid form on the surface of a plate in a single coating step. Thereby, the used plastic material is a liquid polymerizable acrylate system which cures by polymerization.

The mentioned panels known from the prior art have advantages and disadvantages depending on their construction, the used production process and the used materials, respectively. For example, laminate panels are usually easy to install, provide the possibility to realize high quality and any decorations and are also very durable. A disadvantage, however, are typically the acoustic properties of laminate panels, which cause annoying running noises, particularly when used as floor covering. This is due to the very hard melamine layer on the laminate surface. This melamine surface is also found as cold and inconvenient. Coverings based on PVC have excellent acoustic properties and are also found as warm and relatively soft, which is desirable in many applications, such as floor coverings in a bathroom. However, for generating surfaces of optically high-quality such PVC floors must be processed relatively expensive and are therefore substantially more expensive than conventional laminate panels, at least if they should comprise a similar optical quality. The disadvantage of PVC panels is that deep scratches occur fast in the soft surface with intensive use which disturb the optical image. Further, the disadvantage is that the PVC floors are not uncritical from ecological aspect. They contain harmful plasticizers ("Weichmacher") and chlorine is known to be very dangerous (e.g. chlorine dioxin formation, "Chlordioxinbildung") in the case of fire.

Directly printed panels remove some of the disadvantages of laminate panels and require no decorative paper, which is impregnated with melamine resin, whereby the production can be simplified. However, they have disadvantages similar to laminate panels concerning the acoustic properties as well as haptic.

In light of these known panels or coverings, it is object of the present invention to provide a method for producing a panel, in particular a wall-, ceiling- or floor panel comprising as many of the various advantages of the known panels, however, thereby preferably minimizing the inherent existing disadvantages of the various panels. In addition it is a further object that such a panel can be produced inexpensive and in a relatively simple manner. A further object is to provide such panel which have a good durability and allow the realization of decorative patterns of high quality.

These and other objects which are mentioned while reading the present description or can be recognized by the person skilled in the art, are solved with a method for producing a panel according to claim 1 and a corresponding panel according to claim 14.

3. DETAILED DESCRIPTION OF THE INVENTION

According to the invention, a method for producing a panel, in particular a wall-, ceiling- or floor panel is provided, in which a layer of liquid radiation-curing acrylate is applied on a support plate, such as a MDF-plate, in a first step, which comprises a Martens hardness MS1 of 0.5 to 120 N/mm2. In a subsequent step, this layer is at least partially cured. These steps are repeated, if necessary until the desired layer thickness is achieved, wherein the individual layers are applied wet-on-dry. Then, an intermediate layer of fluid radiation-curing acrylate is applied on the most recently cured layer in a further step and thereon—without that this intermediate layer is cured—a further layer of liquid radiation-curing acrylate is applied by means of a film. In other words, the further layer ("Lage") or layer ("Schicht") is applied wet-on-wet. This results, according to the invention, in a partial mixing of the layers, wherein the further layer is an acrylate, which comprises a Martens hardness Ms2, wherein Ms2 is >MS1 after curing. Subsequently, the two wet-on-wet applied layers or layers are preferably completely cured together. Thereby, the single steps mentioned do not have to necessarily follow each other directly, but further intermediate steps can be provided. It is only important that the last two layers or layers, namely the intermediate layer and the further layer are applied wet-on-wet. It has been shown that particularly resistant layer systems are achieved. Additionally, the thus resulting panel has further technical advantages, which will be explained in the following description.

Preferably, the first layers which are applied wet-on-dry are applied via roller works ("Walzenwerke"). Only the further layer which is applied on the intermediate layer is applied wet-on-wet via a film-calender ("Folienkalander") according to the invention. The application of coating means via films is generally known to the person skilled in the art. The coating material is transferred to the, also termed coating film, film in a suitable manner, e.g. via application rolls. The film thus provided with the coating material is then applied or pressed on the substrate to be coated, whereby the coating material is transferred to the substrate. Afterwards, the film can be removed again, wherein the coating material remains mainly or entirely on the substrate. Advantageously, the corresponding installations are working in continuous flow mode ("Durchlaufprinzip"). For example, the basic principles are described in more detail in the applications WO 2007/059805, WO 2007/059967 or WO 2008/061765 of the same applicant, whose content is hereby completely incorporated by reference.

According to the present invention, a panel such as a wall-, ceiling-, but in particular a floor panel is additionally provided which comprises a support plate with a front side and a back side, wherein a layer system is provided at least at the front side, as for example a result of the method according to the invention. The front side should be understood here as the side which represents the useable side facing the viewer in the installed state of the panel, for example in the form of a floor. The support plates can be divided into panels optionally. The panels can have coupling means at their side edges, such as in particular in the form of nut and spring elements, as are known in the field of floor laminate panels.

Particularly suitable nut and spring elements allow for connecting a plurality of similar panels in directions parallel to the front side and perpendicular to the front side by a positive connection. The panels can be individually undergo the procedure, although this approach is less economical. According to the invention, the layer system starting from the front side, comprises a first elastic layer which consists of a polymer and is hereinafter referred to as S1 layer. This first polymer layer according to the invention comprises a thickness of 20-600 μm and has a Martens hardness MS1 of 0.5 to 120 N/mm2, preferably between 2 and 50 N/mm2 and most preferably between 2 and 40 N/mm2, it is therefore soft and elastic. A second layer S2 is provided above this first elastic layer which has a thickness of only 10-200 μm and a Martens hardness Ms2 which is greater than the Martens hardness of the first elastic layer i.e. Ms2>MS1. The Martens hardness Ms2, determined on the panel surface, is between 5-300 N/mm2, preferably 5-80 N/mm2 and more preferably between 10 and 60 N/mm2. An intermediate area (transition area) exists between these two layers S1 and S2 with a Martens hardness MZB wherein Ms2>MZB≥MS1. Preferably, this intermediate area is generated by using the method according to the invention and originates by using the method according to the invention automatically, namely by partially mixing the applied intermediate layer wet-on-wet at the boundary layer with the further layer. Thus, the resulting intermediate area by partially mixing the intermediate layer with the further layer has no homogeneous hardness, but a hardness profile towards the layer S2. In other words, the Martens hardness MZB of the intermediate area is not constant but increases in the course of layer S1 to layer S2. On the one hand the intermediate area improves the mechanical resistance of the layer system and on the other hand improves the acoustic properties of the panels. The layer system according to the invention or layer system produced according to the invention have a significantly improved acoustic damping effect of at least 5 dB, depending on the thickness and softness of the first layer S1 even more than 9 dB compared to a corresponding laminate floor with a melamine resin coating and a plate thickness of 8 mm.

The arrangement of the layer system of the panels according to the invention has the consequence that the surface of such a coated panel—regardless of the material of the support plate—also feels relatively soft and has a pleasantly warm haptic impression for the human sensitivity. In particular, the provision of the thick elastic layer S1 has significantly acoustic advantages. The layer system according to the invention leads to a significantly noise damping effect when walking in comparison to a laminate reference floor. Thus, a loudness of 26 Sone is determined after IHD-W 431 for a laminate reference floor. The bottom which is provided with an elastic layer of S1, a layer S2 and the intermediate area therebetween comprises an improvement factor of 15-70% to this reference floor. A PVC (LVT)—floor was measured with an improvement index of 40% in comparison to the reference. The described wet-on-wet method has a number of serious advantages over the conventional layer-wise application and gelling ("Angelieren") (i.e. partially curing) of each UV-curing acrylate layers:

Usual decorative structural elements such as e.g. a synchronous oak structure can be introduced into the wet layer and cured. Thereby, any degrees of gloss can be adjusted by the film design. Due to the high application amounts of liquid of the wet-on-wet layers also very deep structures of for example 150 μm can be formed. Only very limited and also very flat structures are realizable by the classic successive application and gelling of the individual layers. The controlling of different degrees of gloss is known to be quite expensive. The top layer S2 must have a very high wear resistance with a floor with the arrangement described, otherwise the floor has only moderate performance properties. The advantage of the structuring could theoretically also be reached even if a thick wet layer S2 is applied on a dry layer S1 by means of a structure film. However, the person skilled in the art knows that thus the spectrum of usable acrylate components is limited. If the hardness of the layer S2 is chosen too high, the desired damping effect is lost and it may happen that shrinkage cracks ("Schrumpfrisse") occur after some time by varnish stresses in the surface. If the hardness of the layer S2 is lower, the wear resistance of the surface suffers during usage. These disadvantages are reduced or eliminated with the described wet-on-wet application. In principle, the S1 layer is soft elastic after curing. The desired wear resistance (e.g. scratch- and micro-scratch resistance, abrasion) is achieved with S2. Material stresses and related risk of cracking can be avoided by the intermediate layer which comprises a corresponding hardness gradient.

A variety of different materials come into question as suitable materials for the support plate since the relevant physical properties of the panel according to the invention are essentially determined by the applied layer system. Generally the support plate of the panel according to the invention is preferred and thus for example a MDF-plate, HDF-plate, PVC-plate, cement fiber plate, WPC-plate (Wood Powder Composite), a thermoplastic recycling plate, a wood plate, a wood veneer plate or about a parquet plate, such as a pre-fabricated parquet plate. As mentioned above, the support plate can advantageously have coupling means in the form of nut- and spring elements at their sides, so that the panels according to the invention can be installed, for example, on a floor to form a covering easily.

Generally, the materials for the layers of S1 and S2 as well as the intermediate layer (as S3, if present) acrylate systems or based on acrylates are preferred. Herein, an acrylate system is understood as a polymerizable mixture of double bond-containing mono-, di- and polyfunctional acrylic acid based compounds. Typical representatives are, for example, dipropylene glycol diacrylate, 1,6-hexandiol diacrylate, polyurethane-acrylic acid ester, polyester-acrylic acid ester as available by the production program of the company BASF under the trade name Laromer™-types on the market.

Preferably, the S1 layer is a polymer on the basis of a radical-polymerizable oligomer and/or oligomer mixture. Preferably, it is based on radiation-curing acrylate oligomers. The oligomers are selected so that the layer has damping properties as possible characterized by a Martens hardness of 0.5-120 N/mm2, more preferably 2-50 N/mm2. Such an oligomer formulation consists for example of one or more unsaturated acrylates containing a polyester-, polyether and/or polyurethane structure, with a functionality of 1-4, preferably <2.

Commercially available examples therefore are the Laromer PO 43 F, the Laromer UA 9033 or the Laromer UA 19 T of BASF. The oligomer mixture can further comprise low-viscosity acrylic acid esters having a functionality of 1-4 preferably with a functionality of 1-2. Commercially available examples therefore are the Laromer LR 8887, Laromer DPGDA, Laromer TPGDA of BASF. Photoinitiator such as e.g. mono- or bisacylphosphine oxide, alphahydroxyketone, benzophenone derivative, or benzildimethyketal or phenylglyoxalate are required for curing by means of UV radiation. The formulation may further contain additives such as wetting agents, defoamers, inorganic or organic fillers. For example, polyacrylates, silicones, talcum, barium sulfate, chalk, silica or polyurea derivatives can be used as additives.

The material for the second layer S2 is preferably based on a radical polymerizable acrylate oligomer or a radical polymerizable acrylate mixture consisting of one or more unsaturated acrylates, a polyester, polyether- and/or polyurethane structure containing, with a functionality of 1-8, preferably 3-6. Examples therefore are the Laromer PE 9074, Laromer 8863 or Laromer LR 8987 as varnish raw materials from BASF. Preferably, these acryl mixtures further comprise low viscosity acrylic ester with a functionality of 1-6, preferably with a functionality of 2-4. For example, the following raw material of BASF with the tradenames Laromer HDDA, Laromer TMPTA, Laromer PPTTA can be used. In the case of UV-linking systems photoinitiators such as e.g. mono- or bisacylphosphine oxides, alphahydroxyketone, benzophenone derivatives, benzildimethylketal or phenylglyoxylates are added. Furthermore, additives such as wetting agents, defoamers, matting agents and inorganic or organic fillers may be added, for example, polyacrylates, silicones, talcum, barium sulfate, chalk, silica or polyurea derivatives. The oligomers are selected so that the surface hardness is within the desired range. Furthermore, the raw material selection is made so that the layer S2 brings especially a high wear resistance besides the damping properties (scratch resistance, micro-scratch resistance, abrasion resistance). The material for the intermediate layer is preferably based on the same basic materials as the two layers of S1 and S2. It is most preferably to use the same or at least a similar material as intermediate layer as for the S1 layer, but it must differ from the raw material for the layer S2 in any case intermediate region originates in the final cured product automatically due to the wet-on-wet application of the intermediate layer by the penetration of the components of the materials in the boundary layer of the clashing wet layers i.e. that figuratively speaking: serves as an intermediate layer, the last application of S1, then the resulting intermediate area has the structure of the oligomer of layer S1 after curing at the bottom (thus close to the support plate); an increasing mixing of the structures of the oligomers of S1 and S2 takes place in the direction of the boundary layer. The mixing decreases again above the boundary layer and the structure is on the surface which is determined by the oligomer of the layer S2. The properties of this intermediate area depend on the chemical composition of the S1 and S2 as well as of method parameters during the joining of the two layers in the film calender ("Folienkalander") which affects the mixing.

The thickness of the support plate is preferably between 3 and 20 mm, more preferably between 4 and 15 mm, more preferably between 3 and 12 mm and most preferably between 4 and 10 mm. Depending on the intended use and an applied decor (if available) different shapes are possible. Should the panel imitate for example a genuine wood decor and be installed as a floor- or wall panel, a rectangular basic shape of the support plate or the panel is advantageous, for example, in a rectangular shape of 1½-2 m in length and 10-30 cm in width.

As mentioned above, the relevant physical properties of the surface of the panel according to the invention are mainly determined by the layer system according to the invention. The thick first elastic layer S1 is decisive for the acoustic properties of the panel. Basically particularly preferred hardness values according to Martens for layer S1 are, as mentioned above, 0.5 to 120 N/mm2, preferably between 2 and 50 N/mm2, and most preferably between 2 and 40 N/mm2. The second layer S2 must always comprise a greater hardness than the first layer and can preferably be in the range of 5-300 N/mm2, more preferably at 5-80 N/mm2, and even more preferably between 10 and 60 N/mm2. The material for the intermediate layer, however, should preferably be selected from a material with a lower hardness (after curing) than the layer S2, i.e. a Martens hardness Mz for which applies: Ms2>Mz≥MS1. This must be distinguished from the Martens hardness MZB of the resulting intermediate area, which originates by partially mixing the materials of the intermediate layer and the layer or layer S2 and will therefore be somewhere between the hardness of the layer S2 and the hardness of the intermediate layer. Due to the partially mixing of the intermediate layer with the further layer according to the invention, which forms the layer S2, there is particularly good adhesive properties of the layer system. The person skilled in the art knows that even if the said range specification for the preferred hardness MS1 and Ms2 partially overlap it essentially depends on that MS2 is greater than MS1.

The determination of the Martens hardness is known to the person skilled in the art basically. Herefore it was worked with a Taber Abraser tester 5151 of the company Taber Industries in the development of the present invention. The hardness and track depth ("Spurentiefe") of the samples were determined after every 200 rotations with a S-41-sandpaper. The determination of the Martens hardness (registered hardness testing under the influence of test force) was carried out according to DIN EN ISO 1477. "Fischerscope H100" of Helmut Fischer GmbH was used as tester. The following test parameters were used: maximum force: 50/30 mN as well as testing time: 20 seconds. The determination of the track depth was performed with a mechanical stylus measurement device ("Tastschnittmessgerat"). A Perthometer S3P of the company Perthen was used as a tester.

When measuring the samples it has been shown that it comes to more or less large deviations in the hardness of a given layer depth probably due to the used relatively soft materials. Therefore it is necessary to measure at several points to obtain meaningful representative data by averaging. The hardness as well as the track depth were respectively measured after 200 rotations of the sandpaper measured at four points. It has been shown that four measurement points in most cases provide sufficient accuracy. Of course, you obtain more accurate measurement results, if you use more than four data points, such as for example eight. Preferably, the thickness of the elastic layer S1 is in a range from 20 to 600 µm, more preferably from 80-450 µm and most preferably from 120-240 µm. The second layer S2 has a thickness of 10-180 µm irrespective thereof, more preferably from 20-100 µm and most preferably 30-80 µm. The thicker the first elastic layer S1 is selected, the more elastic the properties of the surface of the coated panel can be. Preferably, the S1 layer is applied successively in substeps over several roller works with respective gelling after the roller application works ("Walzenauftragswerken"). Gelling is understood to mean that a radical polymerization is initiated in the respective layer by radiation for example by means of UV, however, this polymerization is quickly brought to the termination, to ensure the adhesion of the next layers. But, the S1 layer can also be applied in one step, especially if a thin variant of the layer S1 is desired.

Preferably, further a decorative layer is provided between the front side and the layer S1 which comprises a printing ink (ink) or consists of this printing ink. Herein, the term "printing ink" is used generically herein and should not term a single color but generally printing ink: in the case of the digital four-color printing the printing ink e.g. consists of four different colors (Cyan, Magenta, Yellow, Black), from which the printed image is generated by color mixing of the color drops. The decorative image is known to be generated on rotating printing cylinders in the indirect gravure printing ("indirekter Tiefdruck"). Decor specific mixed colors are applied with the printing cylinders. Essentially, it is preferred that the layers are substantially transparent in the present invention, to serve as protection for an underlying decorative layer.

Usually dispersion paints are used in the prior art as a printing ink, such as in particular acrylic colors. This dispersion paints are usually used by the commonly used gravure printing process. Dispersion colors are printing inks which usually consist of three main components, namely a) a solvent (usually water), b) a bonding agent in the form of plastic polymers that assemble in evaporation of the solvent and form a solid layer, and c) color pigments to generate the desired coverage and desired shade. Thus, the curing of these dispersion paints does not take place by polymerization, but by volatilization of the solvent since the bonding agent is already present as polymers. The polymers which are contained in the dispersion link together by evaporation of the bonding agent in a purely physical manner and form a solid, closed layer.

It has been surprisingly determined in the context of the present invention that improved adhesive properties of layer systems according to the invention can be achieved if polymerizable inks are used instead of the usual dispersion paints in the present case. The positive effect is particularly pronounced, if the printing ink of the decorative layer and at least a portion of the first elastic layer S1 is cured or polymerized together (if the decorative layer is directly printed, such as in digital printing, the decorative layer quasi consists of the printing ink). Hereby, the curing of a polymer layer or a polymerizable printing ink is to be understood as the chemical reaction which takes place during the polymerization. This must be distinguished from the drying of such layers, in which only the solvent such as the water content of a dispersion paint evaporates, or is reduced in a purely physical manner. A chemical cross-linking takes probably place at the boundary layer of the two layers due to the joint curing of the polymerizable printing ink and the materials, which is assumed to be responsible for the improved adhesion of the layers as a whole. The conventionally used dispersion paints have no polymerizable acrylate systems, so that no such chemical cross-linking between printing ink, so the decorative layer, and the elastic layer can take place.

Therefore polymerizable printing inks and in particular polymerizable acrylate systems are generally preferred for the used printing inks in the present invention. Polymerizable printing inks contain bonding agents as main components, namely resins containing reactive double bonds; monomers or oligomers such as acrylate monomers and acrylate oligomers; optionally photoinitiators for radiation-curing printing inks; additives such as defoamers, flow additives, etc.; and color pigments and fillers for achieving specific physical technical properties. It is generally preferred that the used printing inks for the present invention are further radiation-curing, such as in particular by UV rays. It is particularly preferred that the printing ink is based on a polymerizable acrylate and/or N-Vinylcaprolactam. In a further embodiment of the present invention, a third elastic layer S3 is provided on the front side below the decorative layer, which has a Martens hardness MS3, wherein the hardness of the third elastic layer is preferably equal or smaller than the hardness of the first elastic layer S1, i.e. MS3≥MS1. This way, especially thick layer systems with respectively good elastic properties can be generated. Preferably, thereby the layer S3 should have a thickness of 10-300 µm, more preferably 30-150 µm and most preferably of 60-120 µm. A radical polymerizable acrylate mixture is used for the layer S3 as described for the layer S1. This oligomer mixture is however mixed with pigments before application to give the film a coated color ("deckende Farbe") as a printing basis, i.e. this layer S3 should not be transparent to achieve a satisfactory printing quality. The decorative layer including eventually any necessary primer- and primer coating layers is then applied on this previously applied layer S3. The advantage of this third layer S3 is that the total layer system can be designed very thick, without that the visual impression of a possibly existing decorative layer is affected since only the first elastic layer S1 and the second layer S2 with the intermediate region is between a viewer and the decorative layer.

The layer system according to the invention has the further advantage that no further paper- or plastic films are required at the front side of the panel and the support plate, as it was necessary in the prior art in many applications. Thus, the panels can be coated in a single run in one system and must not be brought into contact or glued together with a previously produced paper- or plastic film in contact.

Example 1

In a first step, an HDF-support plate with a thickness of 8 mm is provided with a primer by a roller application work based on a commercially available aqueous acrylic dispersion with an application of 10 g/m2. In a next step, the smoothing of the plate takes place by a roller application work by means of a filler ("Spachtelmasse") based on a highly filled aqueous acrylic dispersion with an application amount of 25 g/m2. Subsequently, a printing ground ("Druckgrund") (primer, "Grundierung") is applied on the basis of an aqueous acrylate dispersion which is offset with fillers and color pigments by means of a casting method ("Gießverfahren") (i.e. a curtain coating method, "Vorhangbeschichtungsverfahren") in an amount of 70 g/m2. After each of these coating steps an intermediate drying takes place at temperatures between 80 and 200° C. The thus treated plates are supplied to a printing machine essentially consisting of an engraved printing roller ("Gravurwalze") and a rubber roller ("Gummiwalze") for the transfer of the printed image from the gravure cylinder to the plate. The printing image is generated by three printing works downstream, wherein an own dispersion printing ink consisting of color pigments and an aqueous acrylate dispersion is applied by each printing work. For example 5 g/m2 printing ink is applied in an imitation of a dark walnut wood. In the further process a commercially available UV-primer is applied on the printing ink layer by a roller application work. Now a radical polymerizable acrylate oligomer mixture (1) is applied by the subsequent roller application work in an amount of 80 g/m2. This oligomer mixture (1) contains 70 parts Laromer PE 9032 and 25 parts Laromer TBCH BASF and 5 parts of other additives (as benzildimethylketal as photoinitiator, an aliphatic urethane acrylate with a functionality of 3). A gelling of this layer takes place by means of UV lamps. The same oligomer mixture (1) is applied in an amount of 80 g/m2 on this partially cured layer by a further roller application work. This intermediate layer is supplied wet to a film calender ("Folienkalander"), i.e. without gelling. Then, a further layer of further double-bond containing radiation-curing oligomers provided with photoinitiators are put wet-on-wet on a structural support film in an amount of 50 g/m2 and polymerized together with the previously applied intermediate layer by means of UV radiation. The structure film is permeable for this purpose for UV, so that the applied film can be irradiated therethrough. The oligomer (2) consists of a mixture of 75 parts Laromer PE 9074, 20 parts of Laromer HDDA of BASF and 5% other additives (including Phenylglyoxalat as photoinitiator). After UV-curing, the film is removed and the finished coated decorative plate is obtained, which can be divided into panels in a further process, wherein known coupling means are attached to theses panels. An intermediate area, which does not have a homogeneous hardness, is generated at the boundary of the two layers by the partial mixing of the intermediate layer with the further layer in the finished product.

Example 2

Panels, in which the printing image is generated by radiation-curing printing inks.

Again a 8 mm thick HDF-support plate is used and is provided with an aqueous primer, filler and printing base as described in example 1. The same decorative image is generated on the treated plate by means of a digital printer as described in example 1. Here, however, no dispersion colors are used, but UV radiation-curing digital printing inks. A color amount of about 2 g/m2 is required for the generation of the printing image. The color is initially fixed with 150 mJ/cm2 (mercury). Thereafter the application of 2 g/m2 of a commercially available UV-primer takes place. In this non-irradiated layer is a double bond-containing oligomer (1) provided with photoinitiators applied as in example 1 and this layer is cured together with the ink, i.e. polymerized by UV-radiation. Then the further layers are applied as in example 1. The resulting polymer layer comprises the printing ink and all layers above it. Panels which are generated on this basis are subject to a laboratory test.

Example 3

An HDF-plate is subject to the production stages until after the printing machine as in example 1. A commercially available aqueous UV-primer is applied on the tried printing ink. The plate is heated by the upstream process with a surface temperature of 50-60° C. so that the water of the primer on the surface evaporates quickly and the primer is fixed. Subsequently, an oligomer mixture (1) as described in example 1 is applied in an amount of 50 g/m2 by means of a roller work and gelled by means of UV-radiation. Thereafter, a second roller application of 50 g/m2 of this oligomer mixture (1) takes place followed by gelling and finally a third application (1) of 50 g/m2 followed by gelling. Again, the same oligomer (1) is applied in an amount of 80 g/m2 by means of a further roller application work on this partially cured layer, which corresponds to the layer S1, and thereover the further layer is applied wet-on-wet by means of a film calender in an amount of 30 g/m2 and cured by means of UV-radiation. The further processing of the plates to floor panels takes place as in example 1.

Example 4

In a first step, an HDF-support plate with a thickness of 8 mm is provided with a primer based on a commercially available aqueous acrylate dispersion with an application of 10 g/m2 by a roller application work. In a next step the smoothing of the plate takes place by a roller application work by means of a filler based on a highly filled aqueous acrylate dispersion with an application amount of 25 g/m2. Subsequently, a UV-radiation curing mass is applied in an amount of 40 g/m2 by means of a roller work. This radiation-curing mass consists of 65 parts by weight of the oligomer mixture (1) of example 1 and 35 parts of finely dispersed titanium dioxide. Subsequently, it is gelled by means of UV-radiation. A second application of 40 g/m2 of this mass takes place by a downstream roller application followed by gelling. The thus applied layer corresponds to the layer S1. Thereafter, the digital printing takes place as in example 2. Further, a commercially available UV-primer in the amount of 3 g/m2 is applied by a roller application work.

The further coating takes place as described in example 1 as well as the production of the panels from the starting plates.

Example 5

The process stages of example 4 including the digital printing and subsequent UV-primer coating is performed. The application of the further layers takes place as described in example 3. The thus obtained starting plates are processed into panels.

Subsequently, some determined properties are illustrated for the produced floor materials in the examples 1-5.

Determination of noise emission according to IHD-W 431 (version of 14.05.2012):

All characteristic values were determined disregard of the spectra with the largest and smallest loudness (outlier correction according to IHD-W 431). The result is the difference of the A-weighted overall sound pressure level and loudness of the examined variant compared to the qualified reference floor. The change in the linear characteristic variable loudness (N) is determined in relation to the reference percentual as follows:

Percentual Change:

$((Nref-Nf)*100\%)/Nref$

The determined characteristic value indicates the percentual increase (negative value) or decrease (positive value) of the loudness sensation. The reference is a conventional laminate floor with a melamine coating and a plate thickness of 8 mm.

TABLE 1

| | A-weighted overall sound pressure level | | |
|---|---|---|---|
| Variant | Reference (medium spectrum) [dBA (A)] | Sample (medium spectrum) [dBA (A)] | Improvement factor [dBA (A)] |
| Example 1 | 75.3 | 64.1 | 11.2 |
| Example 2 | 75.3 | 64.8 | 10.5 |
| Example 3 | 75.3 | 65.9 | 9.4 |
| Example I 4 | 75.3 | 63.9 | 11.4 |
| Example 5 | 75.3 | 64.5 | 10.8 |
| LVT (PVC) floor (5 mm thickness) | 75.3 | 64.9 | 10.4 |

("Gesamtschalldruckpegel")

TABLE 2

| | Loudness | | |
|---|---|---|---|
| Variant | Reference (medium spectrum) [Sone] | Probe (medium spectrum) [Sone] | Improvement factor [%] |
| Example 1 | 26.0 | 15.1 | 41.9 |
| Example 2 | 26.0 | 15.2 | 41.5 |
| Example 3 | 26.0 | 16.8 | 35.4 |
| Example 4 | 26.0 | 14.9 | 42.7 |
| Example 5 | 26.0 | 16.1 | 38.1 |
| LVT (PVC) floor (5 mm thickness) | 26.0 | 10.4 | 40.0 |

The examples show that significant noise reductions can be achieved when walking with the coating according to the invention. A reduction of 10 dB is observed by the human hearing as a halving of the loudness. Only HDF-support plates were used as support plates in examples 1-5 to have a direct comparability. Further, significant noise reductions are possible with alternative support plates.

4. DESCRIPTION OF THE PREFERRED EMBODIMENTS

In the following, the present invention is explained in more detail with reference to the accompanying figures.

Figure 1B:
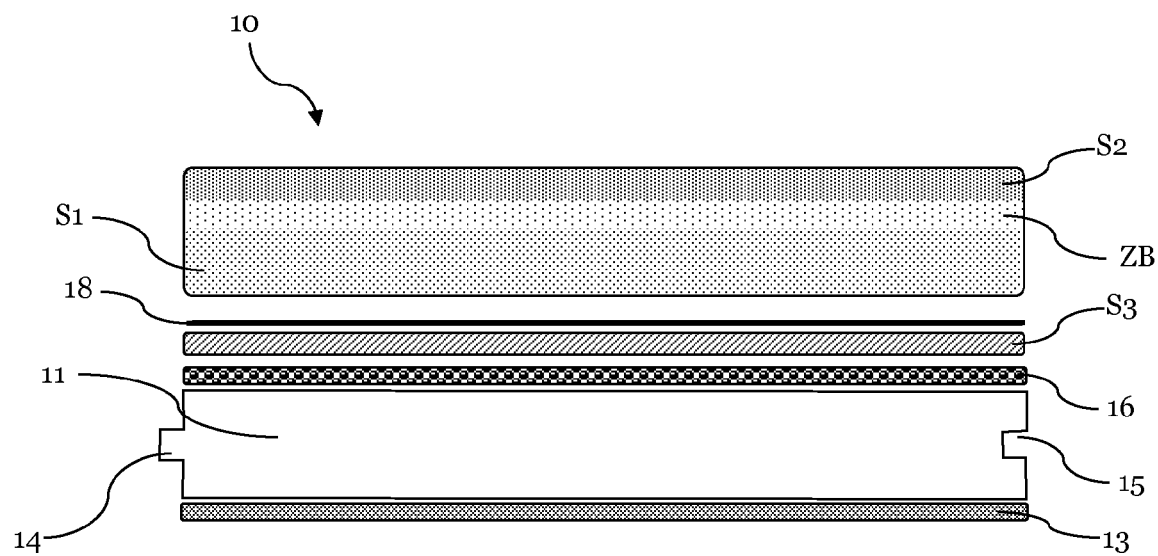
Figure 2:
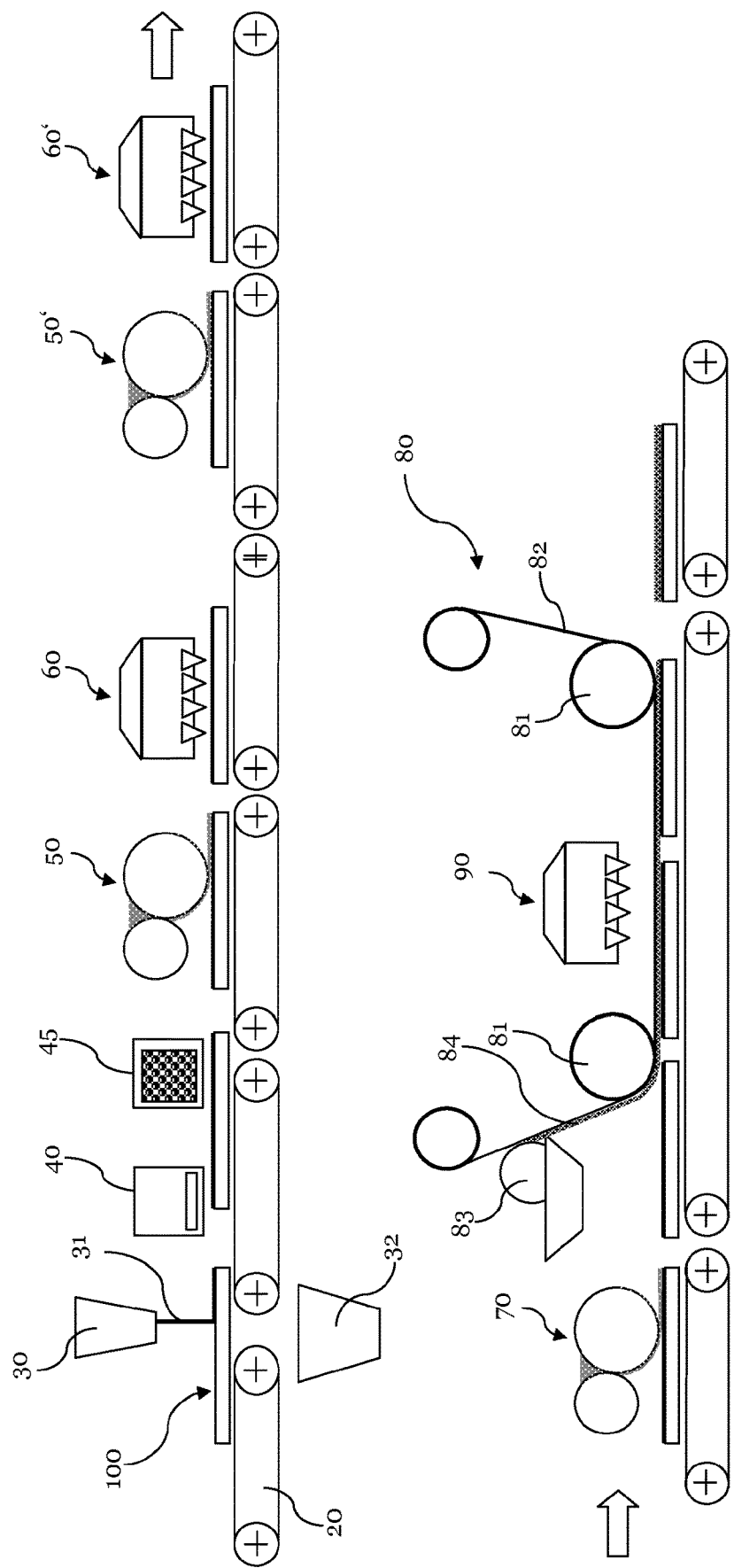

FIGS. 1a and 1b are exemplary layer structures in a schematic representation; and FIG. 2 is an exemplary system for the production of the panel according to the invention in a schematic view.

A schematic layer structure of a panel 10 according to the invention is shown in FIG. 1a. The representation is purely schematic and not scaled. In particular, the support plate 11 is considerably thicker than the further layers 12-18 which are in the range of a few hundred μm. In addition, the individual layers are partially shown in an exploded view for ease of understanding and are all directly adjacent to each other or arranged in direct succession in the real case.

In the example as shown, a support plate 11 with a thickness of about 8 mm of HDF material is shown. A moisture barrier 13 is glued in the form of a suitable plastic film at the back side of the support plate 11. This moisture barrier is optional and depends on the material for the support plate 11 and the desired application. The support plate 11 additionally comprises coupling means in the form of nut-15 and spring elements 14 which are, however, only indicated schematically in FIGS. 1a (and b). Suitable coupling means in the form of nut- and spring elements are known to the person skilled in the art which allow connecting a plurality of similar panels in the directions parallel to the front side as well as perpendicular to the front side by a form fit. Usually, herefore, respective complementary connecting means opposite to each other are provided at the four sides of a rectangular or square support plate. Details for such as connecting means or locking profiles are known to the person skilled in the art from the technology of production of laminate floors, such as e.g. from WO 0188306 or WO 0148332 of the same applicant, which are incorporated by reference herein.

A primer layer 16 with a thickness of for example 50-200 μm is provided in the shown structure system which is based on an aqueous acrylate system. Further very thin primer layers and/or also filler layers are applied below the primer, as are known to the person skilled in the art in the field of directly printed panels. A decorative layer or a decor 18 is printed on the primer. The decor 18 or the decorative layer 18 is applied for example by means of polymerizable printing ink in the digital four-color printing. A first elastic layer S1 with a thickness of 200 μm and a Martens hardness $M_{S1}$ of about 15 N/mm² is provided above the decorative layer 18. A second layer S2 is applied on the first elastic layer S1 which has a thickness of 80 μm and a Martens hardness of about 25 N/mm². An intermediate area ZB is provided between the two layers S1 and S2, which is generated by the fact that the intermediate layer and the layer S2 were applied wet-on-wet, leading to a partial mixing of liquid starting material at the boundary layer of the two layers ("Lagen") or layers ("Schichten"). This is visualized schematically by different density of points in the figures.

The example of FIG. 1b corresponds to the example of FIG. 1a with the difference that here a further elastic layer S3 is provided between the primer layer 16 and the decorative layer 18. Thereby, preferably, the layer S3 has a Martens hardness $M_{S3}$ which is less than the Martens hardness of the layer S1, so $M_{S3} \geq M_{81}$. The first layer S1 can be designed slightly thinner than in the example of FIG. 1a, in example of FIG. 1b which is schematically indicated by different thicknesses in the figures.

In the following, the production of a panel according to the invention is intended to be described exemplary with reference to FIG. 2. FIG. 2 schematically shows a coating system for coating of support layers 100. The support plates are cut in a separate profiling line (not shown) and are profiled after coating. For example, the support plates 100 have a thickness between 3 and 20 mm, a length (as seen in the transport direction of the system of FIG. 2) of 150-200 cm and a width of 125-210 cm. However, any other panel dimensions can be used for the support plates, which are cut in the desired shape and size at the end of the process. The stations of the system which are shown in FIG. 2 are not intended to be exhaustive, but serve only as an example to explain the method according to the invention. Further processing stations can be provided before, behind and between the shown stations, such as for example additional drying stations, stations for applying primers, stations for applying filler, control and monitoring devices, etc. The support plates 100 are transported by roller conveyors 20 through the coating system.

In the first depicted station 30 a primer is applied by means of a fluid curtain 31 of the coating material on the front side (main side) of the support plates 100. The liquid curtain 31 extends over the entire panel width and the plates are transported through this curtain and coated thereby. A collecting container 32 is provided below the device 30 to output the curtain into which the liquid curtain falls when no plate is passed through the curtain, as for example in the gap between two consecutive plates. Preferably, an aqueous acrylic dispersion is used as a coating material for the primer. The applied primer is dried with hot air in a subsequent drying station 40, that is water is removed from the acrylic dispersion. A decorative layer is printed on the primer by means of a digital printing system 45 after the drying of the primer. This decorative layer can for example imitate a real wood, however the digital printing systems commercially available today are able to practically print any desired decor or pattern on the plates. Preferably, a printing ink is used in the printing system 45, which is polymerizable by means of radiation, that is a printing ink, which is based on a polymerizable acrylate and/or N-Vinyl-caprolactam. It is clear to the person skilled in the art that the illustration of the digital printing system 45 is purely schematic and that such printing systems usually consist of several stations. A first layer of liquid radiation-curing aliphatic acrylate is applied in a first coating system 50 after the printing of the desired decor. The material is selected such that it comprises a Martens hardness $M_{S1}$ of 0.5 of 120 N/mm² after curing. The system 50 is a roller application system and is capable of applying a layer of layer thickness of about 40-100 μm applied in one operation. The applied layer of liquid radiation-curing aliphatic acrylate is partially cured by means of UV-radiation in the subsequent station 60. This is followed by a second system 50' for applying a second layer of the same liquid radiation-curing acrylate as the first layer. Again, the station 50' is a roller application station which is usually capable of applying layer thicknesses of 30-100 μm. This second layer is cured by UV radiation at least partially in station 60'. The two cured layers form the layer S1.

Subsequently, an intermediate layer made of the same liquid radiation-curing acrylate is applied in a third coating system 70 as applied in the stations 50 and 60. However this intermediate layer is not cured, but fed to a film calender 80 wet. It is clear to the person skilled in the art that the film calender 80 is only schematically outlined in FIG. 2 to illustrate the individual method steps. In the film calender 80 a structure film 82 is guided around rollers 81. The support plates 100 are guided through below the film 82, so that the film 82 lies on the upper side of the plates 100. If desired, the film 82 can additionally also be pressed against the upper sides of the plates 100 by pressure rollers. A coating material 84 is fed to the film 82 by a coating station 83 which should be applied on the upper side of the plates 100 or on the still wet or moist applied intermediate layer at the station 70, so that it comes to a partial mixing of the two layers at the boundary layer. By this mixing, the later product comprises an intermediate area, during which the hardness $M_{ZB}$ is not constant, but increases from the layer S1 to layer S2. In station 90, both layers are possibly completely cured by UV-radiation. For this purpose, the film 82 is UV-permeable, so that—as shown in FIG. 2 shown schematically—the curing of the layers takes place, while the film is still arranged thereon. Since the film preferably comprises a three-dimensional structure, the negative image of this structure in the cured layers or the hardened layer S2 is impregnated and fixed. Thus, it is possible for example to give the finished panels a three-dimensional wooden structure in order to achieve a realistic imitation of a real wood surface. At the output of the film calender 80 the foil 82 is removed from the surface of the plates and the coating material 84 remains as a hardened layer S2 on the plates.

The invention claimed is:

1. A method for producing a panel, in particular a wall, ceilingor floor panel, comprising the following steps in the indicated order:
   (a) providing a support plate having a front side;
   (a1) applying a primer layer on the front side of the support plate and printing with a printing ink a decorative layer on the primer layer;
   (b) applying a layer of liquid radiation-curing acrylate on the decorative layer, which has a Martens hardness $M_{S1}$ 0.5 to 120 N/mm² after curing;
   (c) at least partially curing of the applied layer of liquid radiation-curing acrylate by radiation in step (b);
   (d) repeating the steps (b) and (c) until a first elastic layer $S_1$ with a thickness of 10 to 600 μm is available;
   (e) applying an intermediate layer of liquid radiation-curing acrylate on the at least partially cured layer;
   (f) applying a second layer S2 of liquid radiation-curing acrylate by means of a film on the previously applied uncured intermediate layer, so that a partial mixing of the layers takes place, wherein
   the second layer is an acrylate, which comprises a Martens hardness $M_{S2}$ after curing, wherein $M_{S2} > M_{S1}$;
   (g) curing together of at least the applied layers of steps (e) and (f) by means of radiation; and
   wherein a third elastic layer S3 having a thickness of 30 to 150 μm is provided between the front side of the support plate and the decorative layer, which third elastic layer after curing has a Martens hardness $M_{s3}$ with $M_{S3} \leq M_{S1}$; and
   wherein, after curing, the hardness of the elastic layer S1 is essentially constant over the entire thickness and the hardness differences within the layer is less than 20 N/mm².

2. The method according to claim 1, wherein the printing ink is a polymerizable printing ink.

3. The method according to claim 2, wherein the printing ink and at least the first applied layer of liquid radiation-curing acrylate are cured together by radiation.

4. The method according to claim 1, wherein after curing $M_{S1}$ is of 2 to 50 N/mm².

5. The method according to claim 1, wherein after curing, $M_{S2}$ is of 5 to 300 N/mm².

6. The method according to claim 1, wherein the steps (b) and (c) are repeated until the first elastic layer S1 has a thickness of 40 to 500 μm.

7. The method according to claim 1, wherein the applying in steps (b) and (e) takes place via rollers.

8. The method according to claim 1, wherein the film for applying the second layer of liquid radiation-curing acrylate is a structuring film.

9. The method according to claim 1, wherein the applied intermediate layer in step (e) is an acrylate, which comprises a Martens hardness $M_Z$ after curing, wherein $M_{S2}$ is $>M_Z \geq M_{S1}$.

10. The method according to claim 1, wherein the support plate is a MDF-plate, HDF-plate, PVC-plate, cement fiberboard, WPC-plate (Wood Powder Composite), thermoplastic recycling board, wood panel, wood veneer plate or parquet plate.

11. The method according to claim 1, wherein the acrylates are aliphatic acrylates.

12. A panel, in particular a wall, ceiling, or floor panel, comprising:
a support plate with a front side and a back side, and
a layer system at least on the front side of the support plate, wherein the layer system starting from the front side comprises:
a first elastic layer S1 of an aliphatic polymer, which has a thickness from 40 to 600 μm and a Martens hardness $M_{S1}$ of 0.5 to 120 N/mm²;
a second layer made of a polymer, which has a thickness of 10 to 180 μm and a Martens hardness $M_{S2}$, wherein $M_{S2}$ is $>M_{S1}$;

an intermediate area between the first elastic layer and the second layer, the intermediate area having a Martens hardness $M_{ZB}$, wherein $M_{S2}$ is $>M_{ZB} \geq M_{S1}$;

and wherein the first elastic layer S1 is at least partially cured by UV radiation before the intermediate area ZB and the second layer S2 are formed on the first elastic layer S1, and
a decorative layer between the front side of the support plate and the first elastic layer, the decorative layer consisting of printing ink,
wherein a third elastic layer S3 is provided between the front side and the decorative layer, which has a Martens hardness $M_{S3}$ with $M_{S3} \leq M_{S1}$;
wherein the third elastic layer S3 has a thickness of 30 to 150 μm; and
wherein the hardness of the first elastic layer S1 is essentially constant over the entire thickness and the hardness differences within the layer is less than 20 N/mm².

13. The panel according to claim 12, wherein $M_{S1}$ is between 2 and 50 N/mm².

14. The panel according to claim 12, wherein $M_{S2}$ is between 5 and 300 N/mm².

15. The panel according to claim 12, wherein the first elastic layer has a thickness of 40 to 500 μm.

16. The panel according to claim 12, wherein the support plate comprises nut- and spring elements at it sides, which allow a connection of several similar panels in directions parallel to the front side as well as perpendicular to the front side by a form fit.

17. The panel according to claim 12, wherein the polymer of the first elastic layer is based on an aliphatic urethane acrylate.

18. The panel according to claim 12, wherein the third elastic layer has a thickness of 60 to 120 μm.

19. The panel according to claim 12, wherein the printing ink is based on a polymerizable acrylate and/or N-vinyl-caprolactam.

20. The panel according to claim 12, wherein the printing ink of the decorative layer and at least a part of the first elastic layer were cured together.

21. The panel according to claim 12, wherein the decorative layer has been applied by digital printing.

22. The panel according to claim 12, wherein the polymer of the second layer is based on one or more of the following acrylates: 1,6-hexanediol diacrylate, polyester acrylate, polyurethane acrylic acid ester and dipropylene glycol diacrylate.

23. The panel according to claim 12, wherein the support plate has a thickness between 3 and 20 mm.

24. The panel according to claim 12, wherein the support plate is a MDF-plate, HDF-plate, PVC-plate, cement fiberboard, WPC-plate (Wood Powder Composite), thermoplastic recycling plate, wood plate, wood veneer plate or parquet plate.

25. The panel according to claim 12, wherein no paper or plastic foil is provided at the front side of the panel.

26. The panel according to claim 12, wherein the first elastic layer, second layer and third elastic layer were radiation cured.

27. The panel according to claim 12, wherein the panel is not provided with abrasion-resistant particles.

28. The panel according to claim 12, wherein the layer system has a damping effect of at least 5 dB compared to the uncoated support plate as measured by EPLF standard.

29. The panel according to claim 12, wherein the hardness differences within the first elastic layer are less than 15 N/mm².

* * * * *